United States Patent [19]
Li

[11] Patent Number: 5,589,929
[45] Date of Patent: Dec. 31, 1996

[54] RF SIGNAL TRAIN GENERATOR AND INTERFEROCEIVERS

[76] Inventor: Ming-Chiang Li, 11415 Bayard Dr., Mitchellville, Md. 20721

[21] Appl. No.: 185,177

[22] Filed: Jan. 24, 1994

Related U.S. Application Data

[63] Continuation-in-part of Ser. No. 18,388, Feb. 17, 1993, and a continuation-in-part of Ser. No. 877,419, May 1, 1992, Pat. No. 5,294,930, and a continuation-in-part of Ser. No. 787,085, Nov. 4, 1991, Pat. No. 5,296,860.

[51] Int. Cl.$^6$ .................. G01C 3/08; G01S 7/40; G01S 13/00; G01S 3/80
[52] U.S. Cl. .............. 356/5.01; 342/172; 342/175; 367/127; 367/149; 356/345
[58] Field of Search .................. 356/5.01–5.15, 356/345, 28.5; 367/149, 127; 342/175, 172

[56] References Cited

U.S. PATENT DOCUMENTS

| | | | |
|---|---|---|---|
| 4,269,506 | 5/1981 | Johnson et al. | |
| 4,446,543 | 5/1984 | McLandrich et al. | 367/149 |
| 4,533,242 | 8/1985 | McLauchlan et al. | |
| 4,906,092 | 3/1990 | O'Meara | 356/28.5 |
| 5,032,839 | 7/1991 | Even-Or | 342/15 |
| 5,140,559 | 8/1992 | Fisher | 367/149 |
| 5,272,484 | 12/1993 | Labaar | 342/375 |
| 5,309,453 | 5/1994 | Treacy | 372/18 |
| 5,442,360 | 8/1995 | Maignan et al. | 342/120 |
| 5,510,890 | 4/1996 | Langdon et al. | 356/28.5 |

*Primary Examiner*—Stephen C. Buczinski

[57] ABSTRACT

New apparatus comprise a optical fiber based RF signal train generator for storing transient RF pulses and regenerating the identical replicas for analysis. The apparatus further comprise RF receivers to process one stored pulse with a reference to other stored pulse. The present invention drastically increases our abilities to investigate acoustical, electromagnetic, and optical transient phenomena.

20 Claims, 5 Drawing Sheets

RF SIGNAL TRAIN GENERATOR AND INTERFEROCEIVERS

This application is a continuation-in-part of application Ser. No. 18,388 filed Feb. 17, 1993 and a continuation-in-part of Ser. No. 877,419 filed May 1, 1992 now U.S. Pat. No. 5,294,930 and a continuation-in-part of Ser. No. 787,085 filed Nov. 4, 1991 now U.S. Pat. No. 5,296,860.

TECHNICAL FIELD OF INVENTION

This invention relates to apparatus which utilize an optical fiber loop based RF signal train generator to store transient pulses and regenerate their identical replicas for analysis. The present invention drastically increases our abilities to investigate acoustical, electromagnetic, and optical transient phenomena.

BACKGROUND

Interferometer is a widely used instrument. The constituents of interferometers may vary, but they all comprise these essential elements: a source, a splitter, two paths, and a detection apparatus. The source may generate acoustical, electromagnetic, and light wave, which is split into two paths by the splitter. The detection apparatus compares waves from the two paths, and determine their variational differences. Interferometer is a powerful instrument, which is capable of probing micro, meso, and macro systems. A system under test may be the source, the splitter, or an external system inserted into an interferometer path. We can infer the physical characteristics of the system under test from the observed variational differences.

An interferometer with a continuous wave source requires both the interferometer and system under test to be stable and stationary. Any random and vibrational motion will blur the variational differences, and mask the physical characteristics of the system under test. An interferometer with a short-pulsed source will freeze a transient natural event. However, with a conventional interferometer we are not able to decipher completely the variational difference created by a single transient event. Multiple pulses and events are needed, thus the short pulse and the transient event have to be exactly and repeatedly reproduced. This may not be possible with all transient events.

Digitizing receiver is another widely used instrument. It comprises a radio frequency (RF) receiver and a digitizer. In a receiving process, the RF receiver first converts an RF signal to an intermediate frequency (IF) signal, and then to a video signal. A digitizer converts the analog video signal to a digital signal. The capability of a digitizer depends on its sampling rate. Digitizers with sampling rate of 200 MHz are commercially available. Digitizers with sampling rate of 1 GHz have been reported. Depending on the capability of a digitizer, the down conversion to a video signal may not be needed and a digitizer may directly digitize a IF signal. A down conversion will filter away many intrinsic traits of a transient event. Most radar receivers have IF frequency of 60 MHz. More sophisticated RF receivers have IF frequency of 10 GHz to preserve the intrinsic traits of subnanosecond RF pulses. It is still impossible for a digitizing receiver to completely capture the intrinsic traits of a single RF pulse with frequency of 10 GHz and pulse width of 1 GHz. Multiple pulses and events are again needed.

In light of the above, there is a need in the art for new apparatus which are capable of capturing the intrinsic traits of and determining the variational differences created by a random, chaotic, turbulent, or transient phenomenon. Furthermore it will reveal the physical traits of a single transient event without instability blurring. An interferoceiver with RF signal train generator will fulfill the needs to capture transient traits and to overcome the blurring. The physical principle for the new interferoceiver to capture an transient event is the same as that for optical fiber based radars with an RF signal train generator.

THEORY OF INVENTION

The conventional method, which rests on the available technology. As the technology evolves, we are able to decipher a single transient event completely. The technology is the optical fiber RF delay loop based RF signal train generator. The information concerns the delay loop and generator can be found in the parent patent applications. With their help, a radar is able to determine the range and Doppler shift of a target with a single radar pulse. We will give a brief discussion here on the RF signal train generation.

Let us assume the single input RF pulse to the loop has the form $$A(t-t_i) \operatorname{Exp}\{+j\omega t\}, \tag{1}$$

where $\omega$ is the circular frequency of the RF pulse with a pulse profile $A(t-t_i)$ centered at the time $t_i$. Experimentally we can not decipher the intrinsic characteristics of a short RF pulse. It is the limitation imposed by the sampling rate and Nyquist theorem. RF pulses are transient. Media were not available to record a transient RF pulse faithfully for the examination at a later time. Since the experimental means did not exist for completely deciphering a short RF pulse, we had to rely on the alternative methods. These methods are only useful to those short RF pulses which can be reproduced exactly by their respective sources. We then examine a portion of each reproduced pulse. The information from the reproduced pulses are aggregated to complete the deciphering of a short RF pulse. A sample oscilloscope uses such a method to decipher a short RF pulse.

Now the optical fiber RF delay loop provides an alternative method. The delay loop causes the pulse delay of the input RF pulse. The pulse train emerged from the optical fiber delay loop can be expressed as $$\sum_{i=1}^{N} A(t-t_i) \operatorname{Exp}\{+j\omega t\}, \tag{2}$$

where N is the number of pulses in the train, $\tau$ the time delay of the loop, and $t_i = i \times \tau$ denotes the time delay of a RF pulse emerged from the storage loop after looping i times. The delay caused by an optical fiber is a dynamical delay. RF pulse in the emerging train replicates the input RF pulse. By examining the copies of its replicas, a short RF pulse can be completely deciphered and repeatedly examined. It is impossible with a conventional digitizing receiver or interferometer.

A reference pulse is required in deciphering an RF pulse. It plays two roles. These are the triggering in a digitizing receiver and the referencing in an interferometer. The triggering instructs the digitizer when to sample. The referencing provides an interferometer with a basis in evaluating what a transient phenomenon has affected the probing pulse. An additional optical fiber RF delay loop has to be introduced in yielding a reference pulse train. An RF signal train generator comprises two identical optical fiber RF delay loops, which will fulfill the needs. We then examine each copy of the RF pulse replicas with the help from a copy of the reference pulse replicas.

Pulsed signals may be acoustical, electromagnetic, and optical. These pulse signals in their respective receivers and interferometers will be eventually converted to the electromagnetic pulse signals. Hence, RF signal train generators can be coupled with acoustical, electromagnetic, and optical signals to investigate their respective phenomena.

SUMMARY OF THE INVENTION

Embodiments of the present invention, which has a board functional capability, advantageously satisfy the above identified needs in the art. Embodiments of the present invention will provide an interoceiver which is versatile and sophisticated. Such an interoceiver will capture the intrinsic characteristics of a transient event without the blurring from its instability. In particular, embodiments of the present invention comprise optical fiber RF delay loops for storing short pulses, and reproducing their identical replicas.

In preferred embodiments of the present invention, the interferoceivers are equipped with an RF signal train generator, digitizing and intra pulse coherent processing subsystems. As a result, a new interferoceiver will be able to freeze a transient event, and will have the functional capabilities of determining the statistical distribution, which describes the instability of random, chaotic, turbulent, and transient phenomena. As those of ordinary skill in the art will readily appreciate, in the light of intra pulse coherence, the instability blurring associated with multiple pulses will no longer be a problem, and external interferences from other sources will be drastically reduced.

In other embodiments of the present invention, the RF signal train generator, digitizing and intra pulse coherent processing subsystems are directly added to conventional digitizers and interferometers to upgrade their functional capabilities as well as removing multiple pulse requirements for these instruments.

BRIEF DESCRIPTION OF THE DRAWING

A complete understanding of the present invention may be gained by considering the following detailed description in conjunction with the accompanying drawings, in which.

DETAILED DESCRIPTION

Figure 1:
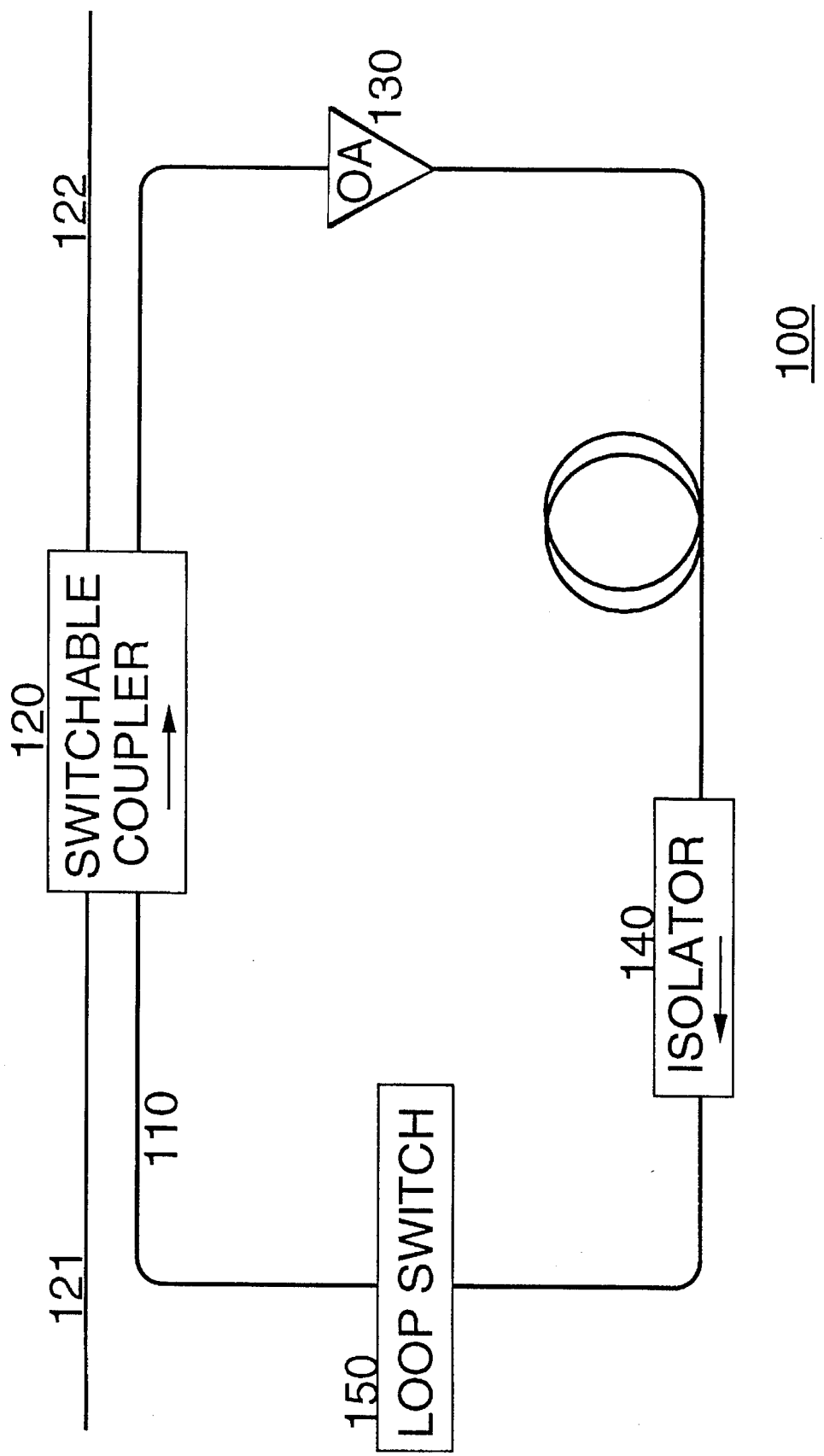
FIG. 1 shows a block diagram of an optical fiber RF delay loop for use in fabricating embodiments of the present invention.

FIG. 1 shows a block diagram of an optical fiber RF delay loop 100 for use in fabricating embodiments of the present invention. This is the same optical fiber RF delay loop as in the parent patent applications of optical fiber based radars and optical RF stereo. As shown in FIG. 1, the optical RF signals through optical fiber 121 are applied as input to switchable coupler 120. Switchable coupler 120 switches the optical RF signals from optical fiber 121 into optical fiber loop 110. Isolator 140 assures the optical RF signals in optical fiber loop circulating only in one direction. As the optical RF signals circulate the optical fiber loop 110, the strength of optical RF signals reduces. The reduction is compensated by in-line optical amplifier (OA) 130 to keep the optical RF signals circulating in the loop again and again until switchable coupler 120 is closed. A portion of optical RF signals is switched from optical fiber loop 110 to optical fiber 122 and the remainder of optical RF signals will still circulate in optical fiber loop 110. The steps repeat again and again. The closing of loop switch 150 will quench the circulation of optical RF signals in optical fiber loop 110 before admitting any new arrivals of optical RF signals from optical fiber 121. Switchable coupler 120, in-line optical amplifier 130, isolator 140 and loop switch 150 are well known to those of ordinary skill in the art.

Figure 2:
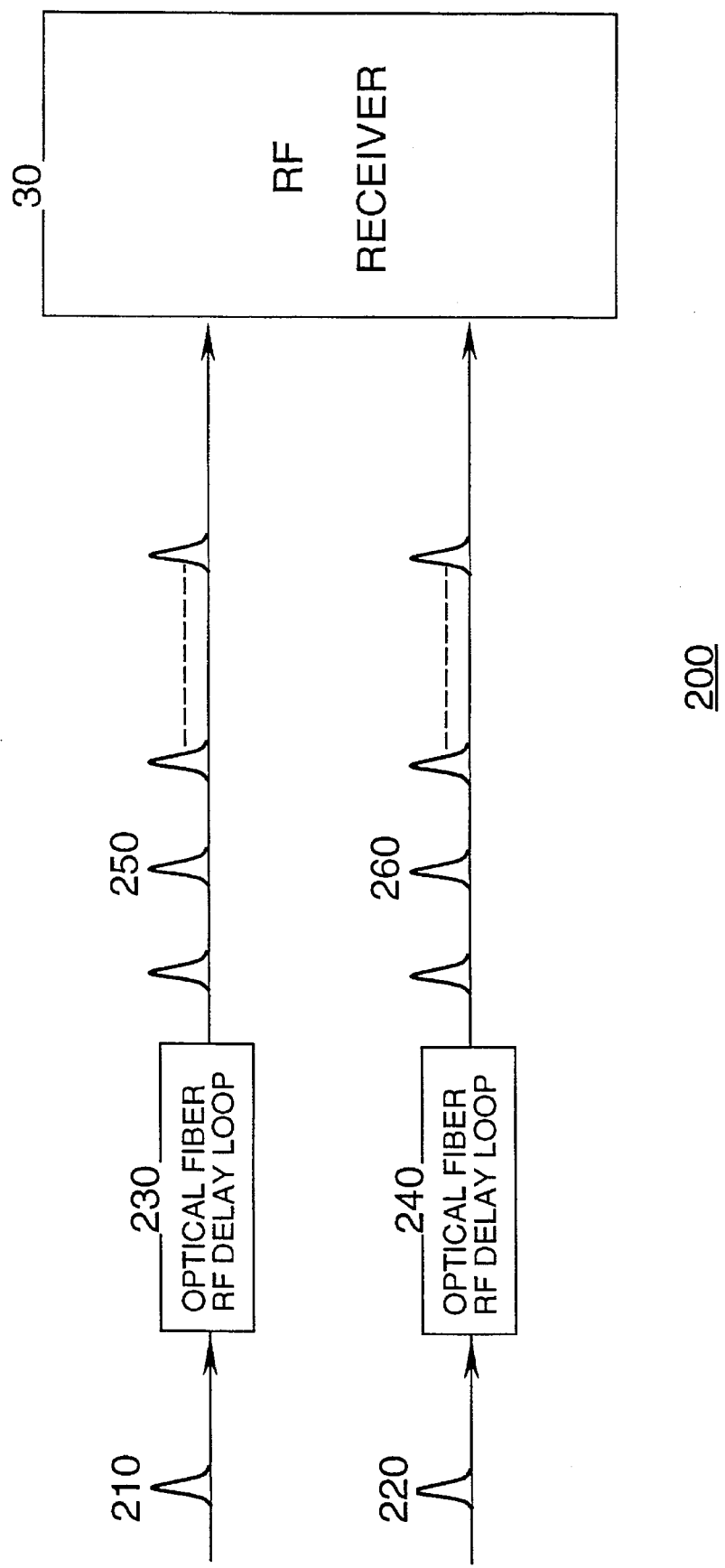
FIG. 2 shows a block diagram of an RF signal train generator for use in fabricating embodiments of the present invention.

FIG. 2 shows a block diagram of an RF signal train generator 200 for use in fabricating embodiments of the present invention. This is the same RF signal train generator as in the parent patent application of optical fiber based radars. RF signal train generator 200 comprises two identical optical fiber RF delay loops according to the present invention. As shown in FIG. 2, two temporally aligned RF pulses 210 and 220 are applied as inputs to their respective optical fiber delay loops 230 and 240. So as not to loose clarity, optical fiber RF up and down converters, and low noise amplifiers have not been depicted in FIG. 2. Loops 230 and 240 are identical and operated in a same manner thus respectively producing two pulse trains 250 and 260.

As those of ordinary skill in the art will readily appreciate, embodiments of the present invention may not comprise an optical fiber RF storage subsystem as in comparison with optical fiber based radars for temporal alignment of two input pulses. The path length difference of two paths from a source to the RF signal train generator usually is small and can be simply adjusted through conventional RF means, which are known to those of ordinary skill in the art. However, if the need arises, one may introduce an optical fiber RF storage subsystem as well. Embodiment of the optical fiber RF storage subsystem is described in the parent patent application of optical fiber based radars. Furthermore, one may double one of the optical fiber delay loop in the RF signal train generator as the optical fiber RF storage subsystem.

RF receiver (RFR) 30 uses direct digitizing and coherent receiving methods to process pulse trains 250 and 260 from RF signal train generator 200. These methods are well known to those of ordinary skill in the art. The direct digitizing method uses one train as triggering pulses to instruct the digitizer to sample the respective pulses of the second train. The triggering is systematically delayed in sampling the sequential pulses of the second train. The direct digitizing method yields the intrinsic structure of the initial pulse, which generates the second pulse train. The coherent receiving method, based on the intra pulse coherence, uses the pulses of one train as reference to process variational differences of their respective pulses of the second train. The mechanism to achieve intra pulse coherence was proposed in the parent patent application of optical fiber based bistatic radar. The coherent receiving method yields the relative amplitudes and phases, or the relative frequency differences between RF pulses 210 and 220. Furthermore, RFR 30 will correlate pulse trains 250 and 260 to achieve a precise determination of their variational differences. The manner in which RFR 30 processes RF pulse trains is well known to those of ordinary skill in the art. As those of ordinary skill in the art will readily appreciate, RF signal train generator 200 of the present invention virtually mimics multiple pulses for RFR 30 to decipher the information contained in RF pulses 210 and 220.

As those of ordinary skill in the art will readily appreciate, embodiments other than the specific architecture shown in FIG. 2 may be fabricated to provide the RF signal train generator. The optical fiber may vary its electrical length under external controls as a variable delay line. The optical fiber RF delay loop may be replaced by a tapped optical fiber RF delay line or by a set of optical fiber RF delay lines.

Figure 3:
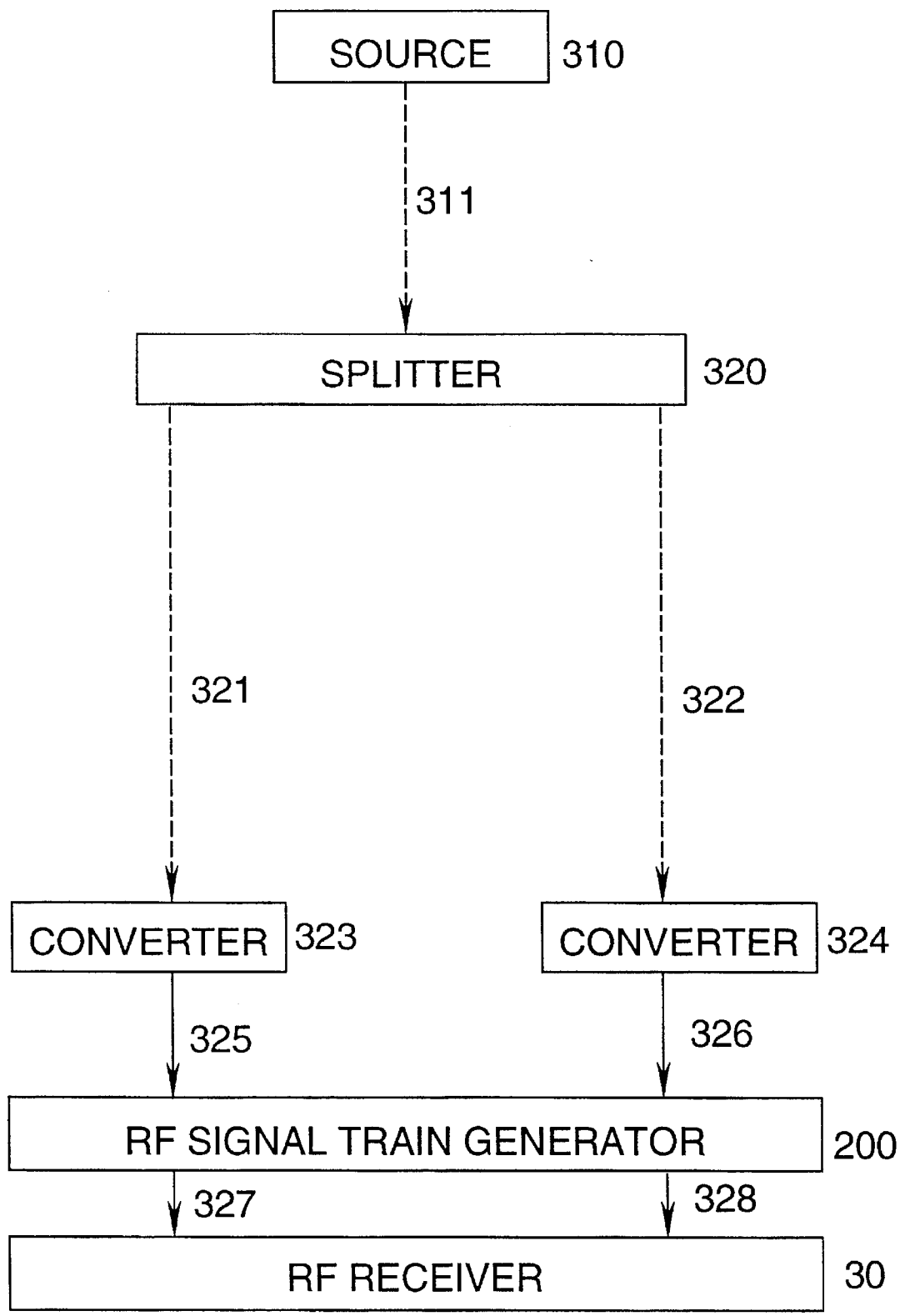
FIG. 3 shows a block diagram of an interferoceiver for use in fabricating embodiments of the present invention.

FIG. 3 shows a block diagram of an interferoceiver for use in fabricating embodiments of the present invention. As shown in FIG. 3 the interferoceiver is comprised of source 310, splitter 320, converters 323 and 324, RF signal train generator 200, and RF receiver 30. Source 310, splitter 320, converters 323 and 324 are well known to those of ordinary skill in the art.

During an operation, source 310 generates acoustical, electromagnetic, or optical signals for transit along path 311. Splitter 320 uses the signals from path 311 as input and outputs two split signals. Furthermore, splitter 320 applies two split signals to two paths 321 and 322 for transit to converters 323 and 324. Converters 323 and 324 then use the signals from paths 321 and 322 as inputs and convert them respectively to optical RF signals. Converters 323 and 324 may simply pass through these signals, if conversions are not needed. Converters 323 and 324 further apply optical RF signals respectively from paths 321 and 322 to optical fiber paths 325 and 326 for transit to RF signal train generator 200. RF signal train generator 200 uses optical RF signals as input and outputs two pulse trains with respective to optical RF signals from paths 325 and 326. RF signal train generator 200 further applies two pulse trains respectively to optical fiber paths 327 and 328 for transit to RFR 30. RFR 30 uses pulse trains from optical fiber paths 327 and 328 as inputs to process these two pulse trains.

RFR 30 may further comprise phase shifters and delay lines for processing transient signals from source 310. Furthermore, as is well known to those of ordinary skill in the art, RFR 30 will yield the spectrum of the signals, transient and intrinsic characteristics of source 310, and turbulence characteristics of the media surrounding source 310.

As those of ordinary skill in the art will readily appreciate, embodiment of interferoceiver 300 will leads to investigation of many transient and nonrepeatable signals in acoustics, electromagnetism, and optics. Those signals in acoustics are the blasts, explosions, thunders, etc . . . . Those signals in electromagnetism are electromagnetic pulses from lightning, violent electromagnetic discharge, electromagnetic pulse of opportunity, electromagnetic pulses emitted by nuclear blasts and celestial objects, etc . . . . Those signals in optics are the lights emitted by atoms and molecules in a turbulent media of burning, discharge, plasma, lightning, etc . . . . Furthermore, all the above mentioned signals are well know to those of ordinary skill in the art.

Figure 4:
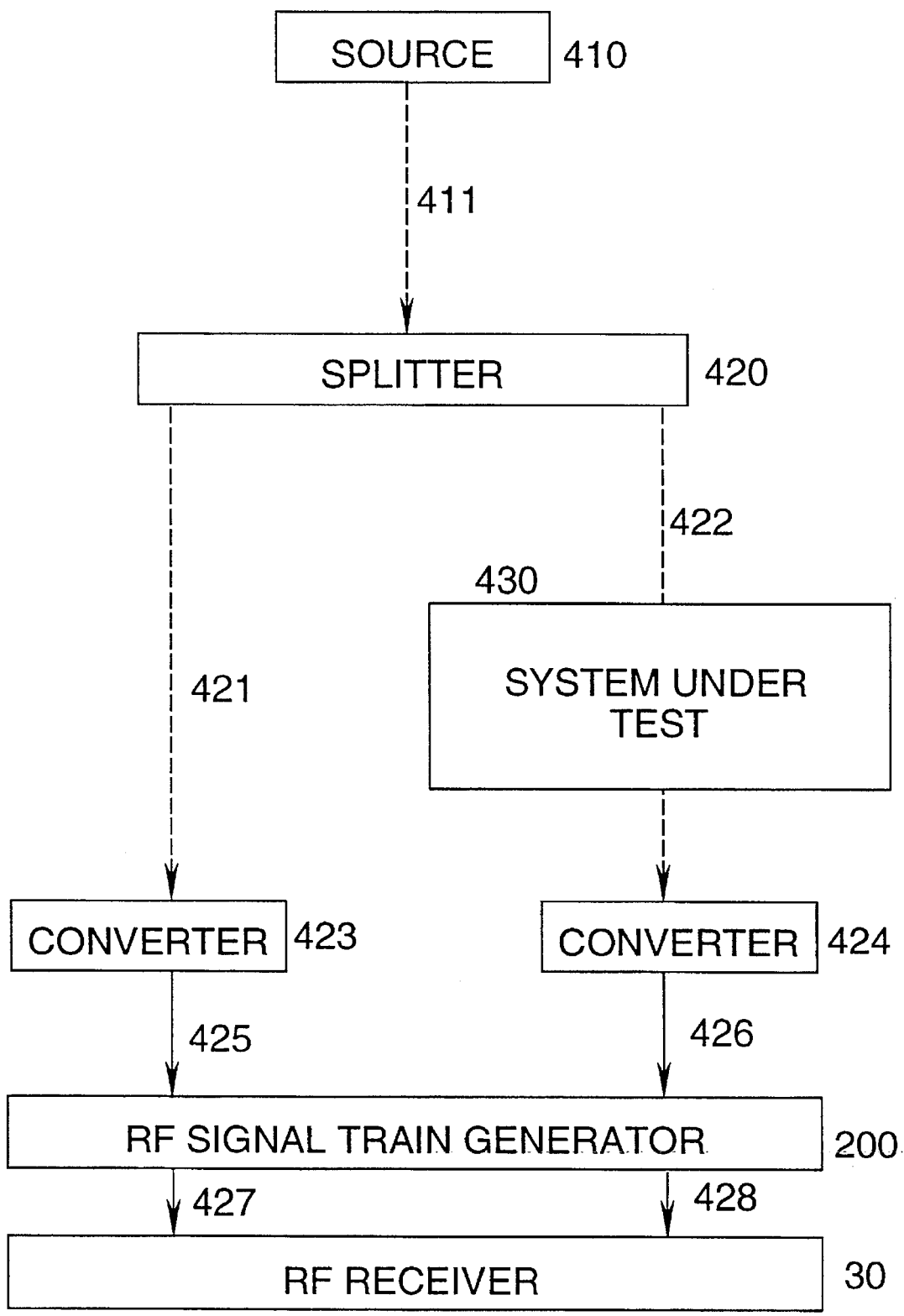
FIG. 4 shows a block diagram of an interferoceiver with a system under test inserted into a path for use in fabricating embodiments of the present invention.

FIG. 4 shows a block diagram of an interferoceiver with a system under test inserted into a path for use in fabricating embodiments of the present invention. As shown in FIG. 4, interferoceiver 400 is comprised of source 410, splitter 420, converters 423 and 424, RF signal train generator 200, and RF receiver 30. Source 410, splitter 420, system under test 430, converters 423 and 424 are well known to those of ordinary skill in the art.

During an operation, source 410 generates acoustical, electromagnetic, or optical signals for transit along path 411. Splitter 420 uses the signals from path 411 as input and outputs two split signals. Furthermore, splitter 420 applies two split signals to two paths 421 and 422 for transit to converters 423 and 325. Signal of path 422 transits through system under test 430. Intrinsic charateristics of system under test 430 is random, chaotic, turbulent, or transient. As those of ordinary skill in the art will readily appreciate that signal of path 422 will interact with system under test and be tainted with the intrinsic characteristics of system under test 430 after the transit. Then converters 423 and 424 use the signals from paths 421 and 422 as inputs and convert them respectively to optical RF signals. Converters 423 and 424 may simply pass through these signals, if conversions are not needed. Converters 423 and 424 further apply optical RF signals respectively from paths 421 and 422 to optical fiber paths 425 and 426 for transit to RF signal train generator 200. RF signal train generator 200 uses optical RF signals as input and outputs two pulse trains with respect to optical RF signals from paths 425 and 426. RF signal train generator 200 further applies two pulse trains respectively to optical fiber paths 427 and 428 for transit to RFR 30. RFR 30 uses pulse trains from optical fiber paths 427 and 428 as inputs to process signal train from path 428 by using signal train from path 427 as a reference. As is well known to those of ordinary skill in the art, the reference signals from splitter 420 through path 421, converter 423, path 425, RF signal train generator 200, path 427 to RFR 30 are protected from external contamination and interference.

As those of ordinary skill in the art will readily appreciate, embodiment of interferoceiver 400 is well suited for investigating random, chaotic, turbulent, or transient features of emitting source 410 and system under test 430. The observed intrinsic traits and variational differences contain information on both emitting source 410 and system under test 430. With a known and pulsed source 410, the processing of signal train from fiber optical path 428 by RFR 30 yields the intrinsic characteristics of the random, chaotic, turbulent, or transient traits within system under test 430. As those of ordinary skill in the art will further appreciate, a coincident circuit may be needed to coordinate the source pulse with a transient event from system under test 430. Furthermore, RFR 30 will separate stable traits of system under test 430 from its random, chaotic, turbulent, or transient features. The method of separation is well known to those of ordinary skill in the art.

As those of ordinary skill in the art will readily appreciate, embodiment of interferoceiver 400 with a pulsed ultrasonic source 410 will lead to diffraction tomography for unstable systems. An unstable motion leads to Doppler shift disturbances in diffraction fields and tomographic image blurring. Embodiment of interferoceiver 400 will further lead to ultrasonic imaging of unstable objects and of fetus. As it is well known to those of ordinary skill in the art, RFR 30 through Fourier transformation and moving center correction will remove Doppler shift disturbances and sharp ultrasonic images of these systems.

As those of ordinary skill in the art will appreciate, embodiment of interferoceiver 400 with a pulsed electromagnetic source 410 will use solid means of coaxial cables and wave guides to transit its electromagnetic signals. For example, a single pulse from the pulsed electromagnetic source 410 will lead to the determination of location and speed for a fly in a transverse electromagnetic cell. As is well known to those of ordinary skill in the art, a conventional methods will only able to determine the location of a fly at rest from a single electromagnetic pulse.

As those of ordinary skill in the art will readily appreciate, embodiment of interoceiver 400 may use a electromagnetic pulse from lightning as a source and cloud layers as system under test 430. RFR then will provide a detailed information concerning the structures of these layers.

As those of ordinary skill in the art will appreciate, embodiment of interoceiver 400 with a continuous wave (CW) laser source 410 and a electromagnetic pulse sensor as system under test 430 will lead to the capture of a single electromagnetic event. Furthermore, RFR 30 will provide a detailed information concerning transient traits and electromagnetic spectrum of the event.

As those of ordinary skill in the art will further appreciate, embodiment of interoceiver 400 with a pulsed laser source 410 will lead to light scatterings by atoms, molecules, microorganisms, medium fluctuations, plasmas, and particles suspended in chaotic media, and many others. As is well known to those of ordinary skill in the art, the scattered lights are affected by the initial positions and velocities of micro objects and statistical properties of media. As is well known to those of ordinary skill in the art, motion of micro objects and turbulence of media will lead to Doppler frequency shifts in scattered lights. As those of ordinary skill in the art will appreciate, RFR 30 through Fourier transformation will reveal the Doppler spectra associated with the motion and turbulence, and their statistical distributions. As those of ordinary skill in the art will appreciate, embodiment of interoceiver 400 will provide a much better tool than conventional methods in revealing intrinsic characteristics of atoms, molecules, microorganisms, medium fluctuations, plasmas, and particles suspended in chaotic media, and many others.

As those of ordinary skill in the art readily appreciate, embodiment of interoceiver 400 with a pulsed laser source 410 will lead to lidars and laser velocimeters. Conventional lidars, which are based on pulsed lasers, only measure the ranges of reflecting objects. Conventional laser velocimeters, which are based on CW lasers, only measure the Doppler shifts from seeded particles. Lidars and laser velocimeters of the present invention, with a help of optical fiber RF storage subsystems, will have both the ranging and Doppler capabilities. As those of ordinary skill in the art will further appreciate, the distinction between lidars and laser velocimeters disappears in the teaching of the present invention. With a subnanosecond pulse source, we will be able to locate constituents in a large reflecting assembly and measure their individual Doppler shift frequencies. As those of ordinary skill in the art will readily appreciate, the teachings from the parent patent applications of optical fiber based bistatic radar and optical RF stereo will lead to the embodiments for fabricating optical fiber based bistatic lidar and optical light stereo.

As those of ordinary skill in the art will further appreciate, the incident and scattered laser pulses may be unsuitable for direct feeding to optical fibers. A second laser can be deployed to down convert the incident and scattered laser pulses to RF signals, then with the help of optical fiber RF converters to up convert the RF signals to optical RF signals for transit through optical fibers to RF signal train generator. The processes of down and up conversions of laser pulses are well known to those of ordinary skill in the art.

Figure 5:
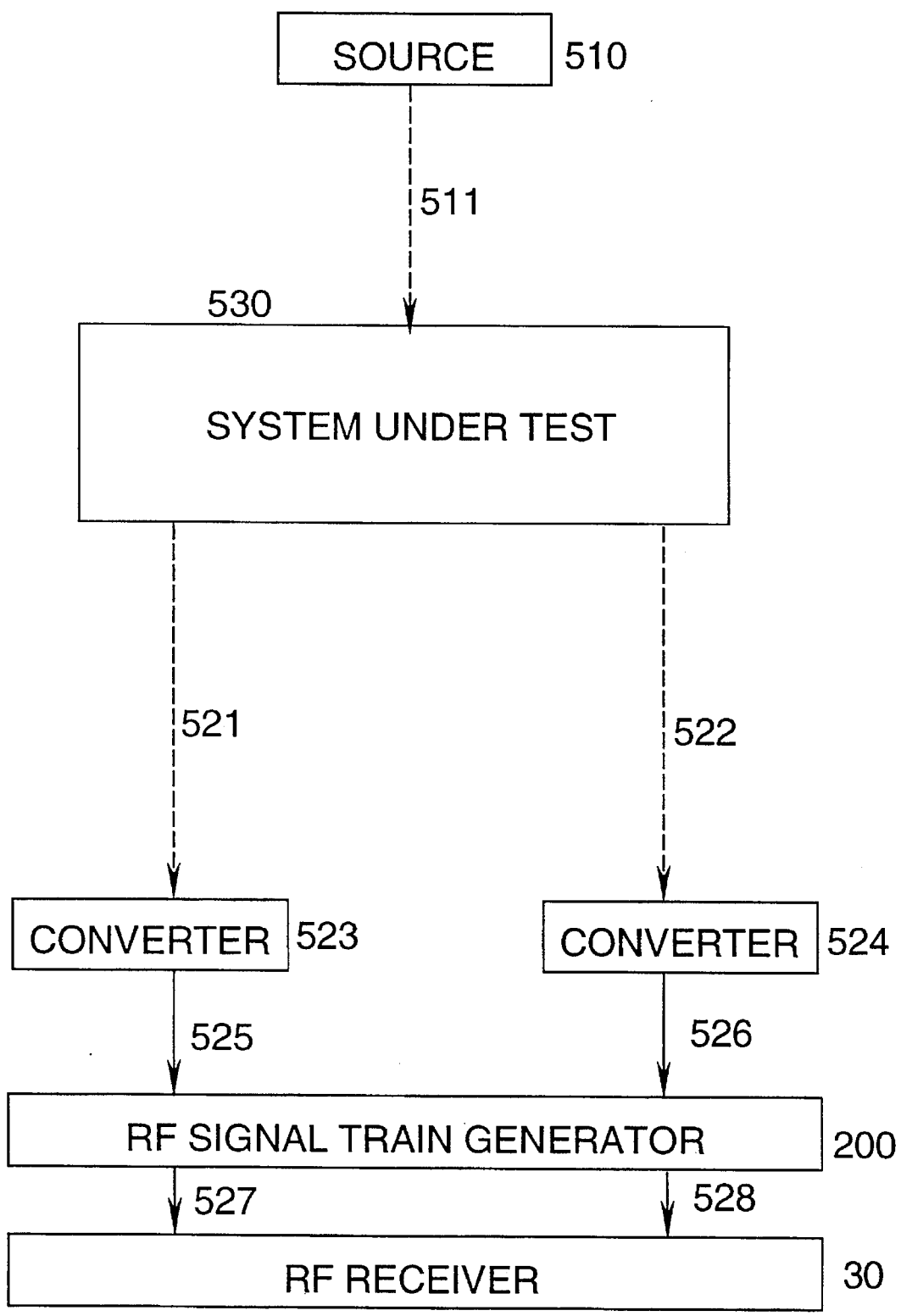
FIG. 5 shows a block diagram of an interferoceiver with a system under test as the splitter for use in fabricating embodiments of the present invention.

FIG. 5 shows a block diagram of an interoceiver with a system under test as the splitter for use in fabricating embodiments of the present invention. As shown in FIG. 5 interoceiver 500 is comprised of source 510, system under test 530, converters 523 and 524, RF signal train generator 200, and RF receiver 30. Source 510, converters 523 and 524 are well known to those of ordinary skill in the art.

During an operation, source 510 generates acoustical, electromagnetic, or optical signals for transit along path 511. System under test 530 uses the signals from path 511 as input, interacts with the signals, and outputs two split signals. Furthermore, system under test 530 applies two split signals to two paths 521 and 522 for transit to converters 523 and 524. Then converters 523 and 524 use the signals from paths 521 and 522 as inputs and convert them respectively to optical RF signals. Converters 523 and 524 may simply pass through these signals, if conversions are not needed. Converters 523 and 524 further apply optical RF signals respectively from paths 521 and 522 to optical fiber paths 525 and 526 for transit to RF signal train generator 200. RF signal train generator 200 uses optical RF signals as input and outputs two pulse trains with respective to optical RF signals from paths 525 and 526. RF signal train generator 200 further applies two pulse trains respectively to optical fiber paths 527 and 528 for transit to RFR 30. RFR 30 uses pulse trains from optical fiber paths 527 and 528 as inputs to process signal train from one path by using signal train from the other path as reference.

As those of ordinary skill in the art will appreciate, for example, embodiment of interoceiver 500 with a pulsed laser source 510 will lead to the correlation of scattered lights in a light scattering process. The correlation yields the Doppler shift difference between two scattered lights. The mechanism of Doppler shift difference determination was proposed in the parent patent application of optical RF stereo. RFR 30 through Fourier transformation will reveal the spectra of the Doppler shift difference associated with the motion of micro objects and turbulence of media, and their statistical distributions.

ADVANTAGES AND OBJECTIVES

Embodiments of the present invention will provide advanced means to upgrade conventional digitizing receivers and interferometers than those furnished by the prior art. As those of ordinary skill in the art will further appreciate, embodiments of the present invention provide added upgrades to the existing digitizing receivers and interferometers without modification, which in turn will be more cost effective and will not interrupt their normal operation.

Embodiments of the present invention will enhance the functional diversities of conventional digitizing receivers and interferometers. In addition, the use of RF signal train generators makes it possible for digitizing receivers and interferometers to completely decipher a single transient event without instability blurring. Furthermore, embodiments of the present invention enable digitizing receivers and interferometers to determine intrinsic traits and Doppler spectrum of a single RF pulse.

Embodiments of the present invention will be able to reveal many hidden mechanisms governing many statistical phenomena. For instance, Doppler spectra of a chaotic medium and a turbulent flow could not be directly observed. Statistical properties of the Doppler spectra now can be systematically investigated. As those of ordinary skill in the art will appreciate, embodiments of the present invention will lead to better understandings of the chaotic media and turbulent flows.

As those of ordinary skill in the art will readily appreciate, averaging with respect to multiple pulses will smear many critical information concerning the system under test. Embodiments of the present invention use a single pulse rather than multiple repetitive pulses. The embodiment will make digitizing receivers and interferometers more versatile and sophisticated in exposing many critical information. As those of ordinary skill in the art will still further appreciate, embodiments of the present invention will lead to better understandings of random, chaotic, turbulent, or transient phenomena.

Embodiments of the present invention will be able to sharpen ultrasonic images. Furthermore, embodiments of the present invention will be able to separate the images of stationary constituents from that of moving constituents. As those of ordinary skill in the art will equally appreciate, optical fiber based radars will also sharpen synthetic aperture radar (SAR) images, and separate SAR images of stationary constituents from that of moving constituents.

Embodiments of the present invention will be able to reveal intrinsic traits of an active system. Intrinsic traits of an active system is inherited, like imperfection in a diamond. As those of ordinary skill in the art will equally appreciate, optical fiber based radars and passive RF systems will provide excellent means in revealing the unintended modulation on pulse by active and passive objects.

Embodiments of the present invention will be advantageous to disclose internal constituents of a system and to reveal their characteristics. As those of ordinary skill in the art will equally appreciate, optical fiber based radars and passive RF system possess excellent means in suppression of clutter returns and of multiple path interferences.

Embodiments of the present invention will lead to more effective means in deciphering a transient event than a fast digitizer under development or a group of parallel digitizers. A fast digitizer creates a massive data stream in a very short time interval. It is difficult for a medium to receive such a data stream.

Embodiments of the present invention will be advantageous in destructive testings, for example, automobile collision tests. Transient signals from various sensors will be thoroughly analyzed by interferoceivers. Embodiments of the present invention will provide better understandings as well as reducing the costs in destructive tests.

Quantum mechanics is a mechanics of coherent. Many interesting coherent phenomena implicated by Einstein, Podolsky, and Rosen paradox are still waiting for us to discover. Embodiments of the present invention will provide us new tools for us to discover these interesting phenomena.

SUMMARY, RAMIFICATIONS, AND SCOPE

Those skilled in the art readily recognize that embodiments of the present invention may be made without departing from its teachings. For example, the interferoceivers may have many designs as well as different variations. The source of an interferoceiver may play the role of a splitter as well. Two signals at different angle perspectives from a source are sent directly to the RF signal train generator. An interferoceiver may compare two sequential events from a source with the help from an optical fiber RF storage subsystem to temporally align these two events. Such a comparison leads to inter pulse coherence. The mechanism to achieve inter pulse coherence was proposed in the parent patent application of optical fiber based radars. Thus the scope of the invention should be determined by appended claims and their legal equivalent, rather by the examples presented here.

What is claimed is:

1. An interferoceiver comprising:
   an input system for receiving one or more RF signals from a source and for applying the one or more RF signals to an RF signal train generator;
   wherein the RF signal train generator comprises:
   means, responsive to the input, for storing the one or more RF signals;
   means for regenerating replicas of the one or more stored RF signals;
   means for pairing the regenerated replicas; and
   means for outputting the paired replicas.

2. The interferoceiver of claim 1 further comprising an RF receiver; wherein the RF receiver comprises means for receiving the replicas of the RF signals; and means for processing the replicas with a reference to their pairs.

3. The interferoceiver of claim 2 wherein said source comprises means for generating an acoustical signal and for splitting the generated acoustical signal in parts; wherein the interferoceiver further comprises means for sending one of parts to the RF signal train generator; wherein the interferoceiver further comprises a system under test, and means for sending other parts through the system under test to the RF signal train generator; wherein the RF signal train generator further comprises means for convening acoustical signals to RF signals.

4. The interferoceiver of claim 2 wherein said source comprises means for generating an acoustical signal; wherein the interferoceiver further comprises a system under test, and means for sending the acoustical signal to the system under test; wherein the system under test comprises means for splitting the acoustical signal into parts, and for sending split parts to the RF signal train generator; wherein the RF signal train generator further comprises means for converting acoustical signals to RF signals.

5. The apparatus of claim 2 wherein said source comprises means for generating an RF signal and for splitting the generated RF signal in parts; wherein the interferoceiver further comprises means for sending one of parts to the RF signal train generator; wherein the interferoceiver further comprises a system under test, and means for sending other parts through the system under test to the RF signal train generator.

6. The interferoceiver of claim 2 wherein said source comprises means for generating an RF signal; wherein the interferoceiver further comprises a system under test, and means for sending the RF signal to the system under test; wherein the system under test comprises means for splitting the RF signal into parts, and for sending split pans to the RF signal train generator.

7. The interferoceiver of claim 2 wherein said source comprises means for generating an optical signal and for splitting the generated optical signal in parts; wherein the interferoceiver further comprises means for sending one of parts to the RF signal train generator; wherein the interferoceiver further comprises a system under test, and means for sending other parts through the system under test to the RF signal train generator; wherein the RF signal train generator further comprises means for converting optical signals to RF signals.

8. The interferoceiver of claim 2 wherein said source comprises means for generating an optical signal; wherein the interferoceiver further comprises a system under test, and means for sending the optical signal to the system under test; wherein the system under test comprises means for splitting the optical signal into parts, and for sending split parts to the RF signal train generator; wherein the RF signal train generator further comprises means for converting optical signals to RF signals.

9. A method for operating an interferoceiver comprising steps of:
   (a) storing one or more RF signals from a source in an RF signal train generator;
   (b) regenerating replicas of the one or more stored RF signals from the RF signal train generator; and
   (c) pairing the regenerated replicas.

10. The method of claim 9 further comprising steps of:
   (d) processing the replicas in a reference to their pairs.

11. The method of claim 10 further comprising steps of:
   (e) generating an acoustical signal from the source;
   (f) splitting the acoustical signal into parts;
   (g) sending one of part to the RF signal train generator and send other parts through a system under test to the RF signal train generator; and
   (h) converting acoustical signals to RF signals.

12. The method of claim 10 further comprising steps of:
   (e) generating an acoustical signal from the source;
   (f) sending the acoustical signal to a system under test;
   (g) splitting the acoustical signal by the system under test and sending the split acoustical signals to the RF signal train generator; and
   (h) convening acoustical signals to RF signals.

13. The method of claim 10 further comprising steps of:
   (e) generating an RF signal from the source;
   (f) splitting the RF signal into pans; and
   (g) sending one of part to the RF signal train generator and send other parts through a system under test to the RF signal train generator.

14. The method of claim 10 further comprising steps of:
   (e) generating an RF signal from the source;
   (f) sending the RF signal to a system under test; and
   (g) splitting the RF signal by the system under test and sending the split RF signals to the RF signal train generator.

15. The method of claim 10 further comprising steps of:
   (e) generating an optical signal from the source;
   (f) splitting the optical signal into parts;
   (g) sending one of parts to the RF signal train generator and send other parts through a system under test to the RF signal train generator; and
   (h) converting optical signals to RF signals.

16. The method of claim 10 further comprising steps of:
   (e) generating an optical signal from the source;
   (f) sending the optical signal to a system under test;
   (g) splitting the optical signal by the system under test and sending the split acoustical signals to the RF signal train generator; and
   (h) converting optical signals to RF signals.

17. An apparatus for investigating transient phenomena comprising:
   an input system for receiving an RF pulse from a source and for applying the RF pulse to an RF signal train generator;
   wherein the RF Signal train generator comprises:
   means, responsive to the input, for storing the RF pulse;
   means for regenerating a train of replicas from the stored RF pulse; and means for sampling regenerated replicas in the train with different delays.

18. The apparatus of claim 17 wherein said source is an optical, infrared electromagnetic, mechanical or acoustical source.

19. The apparatus of claim 17 wherein said RF signal train generator further comprises: means for receiving a second pulse from the source and for generating the replicas of the second pulse; wherein the apparatus further comprises means for processing the replicas of the first pulse with a reference to the replicas of the second pulse.

20. The apparatus of claim 17 further comprises means for processing the replicas with an RF receiver.

* * * * *